UNITED STATES PATENT OFFICE.

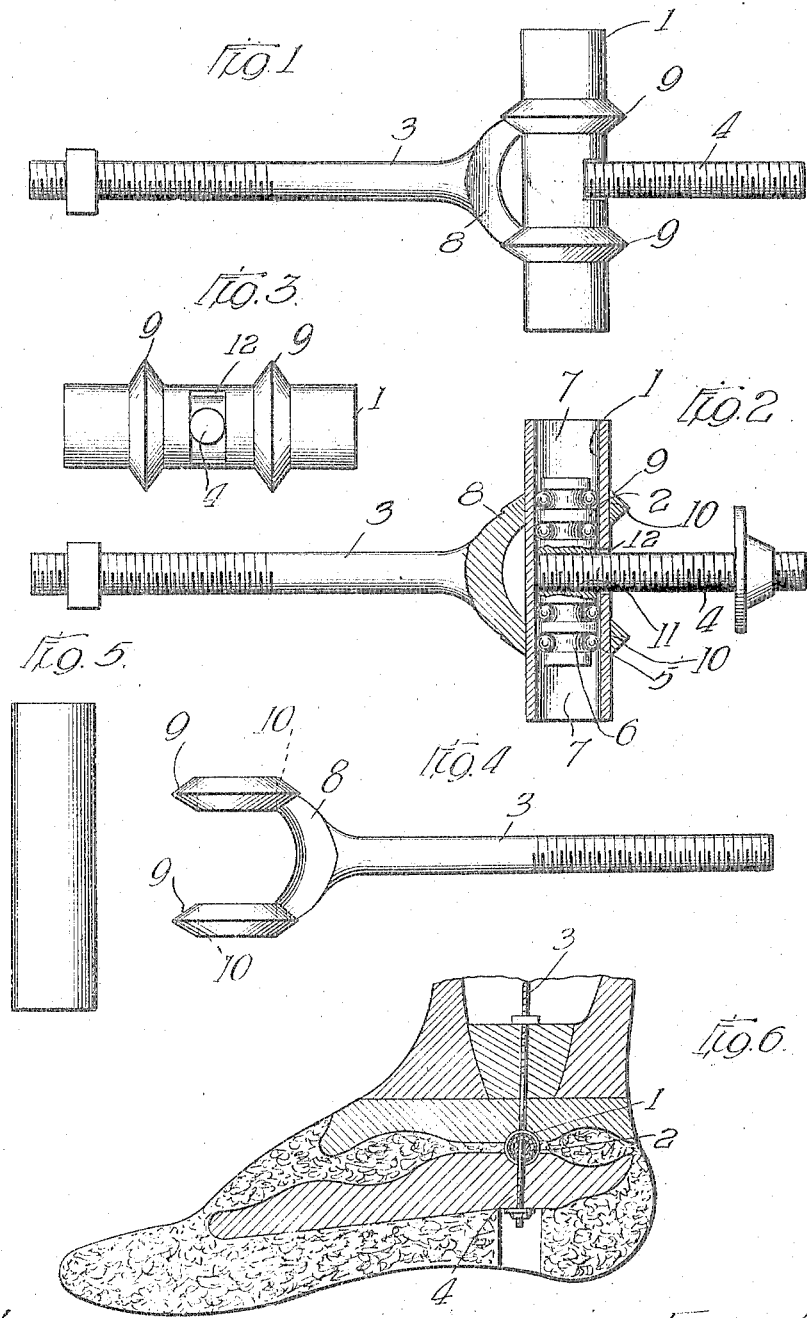

JAMES F. ROWLEY, OF CHICAGO, ILLINOIS.

HINGE-JOINT FOR ARTIFICIAL LIMBS.

1,322,059.  Specification of Letters Patent.   Patented Nov. 18, 1919.

Application filed March 27, 1919.  Serial No. 285,503.

*To all whom it may concern:*

Be it known that I, JAMES F. ROWLEY, a citizen of the United States of America, and a resident of Chicago, county of Cook, and State of Illinois, have invented certain new and useful Improvements in Hinge-Joints for Artificial Limbs, of which the following is a specification.

This invention relates to ankle joints, for artificial limbs, of the kind shown in my Patent No. 1,090,881, dated March 24, 1914.

The main object of this invention is to provide an improved construction of such an ankle joint to simplify the manufacture thereof and substantially reduce its weight and cost.

An illustrative embodiment of this invention is shown by the accompanying drawings, in which—

Figure 1 is a side elevation of an ankle joint constructed in accordance with this invention.

Fig. 2 is a longitudinal sectional detail of the same.

Fig. 3 is a view taken from the right of Fig. 2.

Fig. 4 is a detail of the rod or shank which supports the bearing on the shin section.

Fig. 5 is a detail of the tubular member which is supported on said shank.

Fig. 6 is a vertical section of an artificial foot, showing the improved joint as applied thereto.

In my prior Patent, No. 1,090,881, the bearing member and the bolt shank whereby it is attached to the leg section of the artificial limb, is made of a drop-forging in one piece and is thereafter bored out to tubular form and has its ends turned to cylindrical form concentric with the bore. By employing commercial tubing to form the bearing member, several operations required in the manufacture of the former construction are avoided, and the resulting device is considerably lightened without affecting its strength.

The specific embodiment herein illustrated comprises a pair of members 1 and 2 arranged one within the other and secured to the bolt shanks or rods 3 and 4 respectively. Roller bearings 5, seated in ball races 6 formed in the member 2, provide for an easy, noiseless working of the joint.

The tubular bearing member 1 extends beyond the ends of the member 2 so as to provide widely spaced rocker bearings which strengthen and stabilizes the joint against side strains, and also to provide pockets 7 into which a quantity of lubricant may be placed to insure proper lubrication of the joint throughout the life of the limb.

The special feature of this invention is the particular construction of the shank 3 and its connection to the tubular bearing member 1. Said shank is preferably a drop-forging formed with a fork 8 the ends of which are enlarged and flattened and drilled out so as to provide eyes or rings 9 spaced apart and alined at right angles to the shank. The bores 10 of the rings 9 are made as nearly as possible the same as the exterior diameter of the tubular member 1.

The shank 3 is secured to the member 1 by heating the rings 9 so as to expand the same and permit the tube to be slipped into place. As the rings cool off they contract and firmly grip the member 1.

The shank 4 is threaded and screwed into the threaded opening 11 in the inner member 2. A peripheral slot 12 is formed in the tubular member 1 between the rings 9, to receive the shank 4 and permit it to have the required amount of angular movement relative to the member 1.

Although but one specific embodiment of this invention has been herein shown and described, it will be understood that numerous details of the construction shown may be altered or omitted without departing from the spirit of this invention as defined by the following claims.

I claim:

1. A joint for artificial limbs, comprising a bearing tube transversely slotted intermediate its ends, a bearing member rotatably mounted within said tube and having a shank extending through the slot in said tube, and a rod forked at one end, said forked end being shaped and arranged to embrace said tube at opposite sides of the slot therein with said rod in radial relation thereto.

2. In a joint for artificial limbs, the combination of a rod having an eye at one end thereof, a separate tubular bearing member secured to said rod within said eye, a second member rotatably mounted within said bearing member, and a shank attached to said second member.

3. In a joint for artificial limbs, the combination of a rod having a pair of eyes integrally formed thereon at one end and spaced apart, a tubular member attached to said rod within said eyes, a second member rotatably mounted within said tubular member, and a shank attached to said second member.

Signed at Chicago this 25th day of March, 1919.

JAMES F. ROWLEY.